United States Patent
Ancin

(10) Patent No.: US 6,731,775 B1
(45) Date of Patent: May 4, 2004

(54) DATA EMBEDDING AND EXTRACTION TECHNIQUES FOR DOCUMENTS

(75) Inventor: Hakan Ancin, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 615 days.

(21) Appl. No.: 09/659,479

(22) Filed: Sep. 11, 2000

Related U.S. Application Data

(63) Continuation-in-part of application No. 09/136,161, filed on Aug. 18, 1998, now Pat. No. 6,456,393.

(51) Int. Cl.$^7$ .............................................. G06K 9/00
(52) U.S. Cl. ....................................... 382/100; 382/176
(58) Field of Search ................................ 382/100, 232, 382/176; 380/210, 287, 252, 54; 713/176

(56) References Cited

U.S. PATENT DOCUMENTS

| | | | | |
|---|---|---|---|---|
| 5,315,098 A | | 5/1994 | Tow | 235/494 |
| 5,406,640 A | * | 4/1995 | Fitzpatrick et al. | 381/11 |
| 5,699,427 A | | 12/1997 | Chow et al. | 380/3 |
| 5,710,636 A | | 1/1998 | Curry | 358/298 |
| 5,710,834 A | | 1/1998 | Rhoads | 382/232 |
| 5,734,752 A | | 3/1998 | Knox | 382/212 |
| 5,761,686 A | * | 6/1998 | Bloomberg | 715/529 |
| 6,438,251 B1 | * | 8/2002 | Yamaguchi | 382/100 |
| 6,580,804 B1 | * | 6/2003 | Abe | 382/100 |
| 6,600,828 B1 | * | 7/2003 | Kawamura | 382/100 |

OTHER PUBLICATIONS

Bhattacharjya et al., "Data Embedding in Text for a Copier System", IEEE Proc., International Conference on Image Processing, Oct. 1999, pp. 245–249.*

Brassil et al., "Electronic Marking and Identification Techniques to Discourage Document Copying", IEEE Proc., Infocom '94 Conference on Computer communications, Jun. 1994, pp. 1278–1287.*

\* cited by examiner

*Primary Examiner*—Leo Boudreau
*Assistant Examiner*—Ryan J. Miller
(74) *Attorney, Agent, or Firm*—Michael T. Gabrik

(57) ABSTRACT

Improved data embedding and extracting techniques provide a way to embed and extract messages in text sections of documents during copying. Extracted text pixels are grouped together to form text lines of the document. From this formation, a document layout is constructed that is used to embed the message in the text pixels. Each text line is partitioned into blocks, and those of which contain a certain threshold percentage of text pixels are identified as valid. Each valid block is used to embed one bit of information by labeling text pixels of that block with a certain predetermined color. The embedding of bits in valid blocks in a particular text line is done in a column-wise raster order. Only one message character (which may be comprised of multiple bits) is embedded in a particular text line, although that character may be embedded multiple times in the same line if there are enough valid blocks. Extracting a message so embedded involves forming a first representation of the document in which pixels are classified to locate blocks of pixels in which data is embedded, forming a second representation of the document to extract text lines and identify text pixels. These two representations are compared to identify clusters of color-labeled pixels in each text line to determine the location of embedded bits of the message. The clusters in each text line are sorted in accordance with the predetermined embedding order and converted into a sequence of bits which are decoded to determine the message character embedded in each text line.

40 Claims, 14 Drawing Sheets

DATA EMBEDDING AND EXTRACTION TECHNIQUES FOR DOCUMENTS

CROSS REFERENCE TO RELATED APPLICATIONS

This application is a continuation-in-part of application Ser. No. 09/136,161, now U.S. Pat. No. 6,456,393 entitled "Information Embedding in Document Copies," filed on Aug. 18, 1998, the contents of which is incorporated by reference herein.

BACKGROUND OF THE INVENTION

1. Field of the Invention

This invention relates to a method and apparatus for embedding data in text regions of a document in a visually imperceptible way, and to a method and apparatus for extracting such embedded data. The data embedding is particularly well suited to be implemented during copying of the document. The invention also relates to programs of instructions for implementing various aspects of the embedding and extracting processes.

2. Description of the Related Art

Since facilities for reproducing documents are widely available, it has become important in many situations to be able to track document reproduction. A way that has commonly been suggested is for the copier to somehow embed information that is not readily perceptible visually but can nonetheless be recovered by machine optical scannings. One proposed approach is to add a number of low-amplitude perturbations to the original image and then correlate those perturbations with images of suspected copies. If the correlations are as expected, then the suspected document is very probably a copy. However, this approach tends to introduce an element of judgment, since it is based on varying degrees of correlation. Also, it does not lend itself well to embedding actual messages, such as copier serial numbers.

Another approach is to employ half-toning patterns. If the dither matrices employed to generate a half-toned output differ in different segments of an image, information can be gleaned from the dither-matrix selections in successive regions. But this approach is limited to documents generated by half-toning, and it works best for those produced through the use of so-called clustered-dot dither matrices, which are not always preferred.

Both of these approaches are best suited to documents, such as photographs, that consist mainly of continuous-tone images. In contrast, the vast majority of reproduced documents consist mainly of text, so workers in this field have proposed other techniques, which take advantage of such documents' textual nature. For example, one technique embeds information by making slight variations in inter-character spacing. Such approaches lend themselves to embedding of significant amounts of information with essentially no effect on document appearance. However, such approaches are not well suited for use by photocopiers, which do not receive the related word processor output and thus may not be able to identify actual text characters reliably.

Thus, what is needed is a data embedding technique that exhibits advantages of text-based approaches in a way that is more flexible and robust than traditional approaches.

SUMMARY OF THE INVENTION

Objects of the Invention

Therefore, it is an object of the present invention to provide a technique for identifying blocks comprised mainly of pixels that meet certain criteria typical of text-character parts and embedding the intended message by selectively labeling text pixels in blocks thus identified with a particular color.

It is another object of this invention to provide a technique for extracting a message embedded using the above embedding technique.

Summary

According to one aspect of this invention, a method for embedding a message in a text-containing document is provided. The method comprises the steps of obtaining a pixel representation of the document; identifying text pixels of the document; determining each text line of the document; partitioning each determined text line into a plurality of blocks; identifying each block as valid if that block contains at least a predetermined percentage of text pixels; and embedding a binary element in each valid block by labeling text pixels within that block with a first color or a second color to embed the message in the document.

The message is one or more characters in length, with each character being represented by one or more binary elements (e.g., a bit stream). In a preferred embodiment, each character of the message is comprised of a first binary element sequence, and each such first binary element is, in turn, comprised of a second binary element sequence. Preferably, the bit stream of only one character is embedded in each text line but that character's bit stream is embedded multiple times in that text line. Depending on the number of lines of text in the document and the number of characters in the message, one or more of the characters may be embedded in more than one text line.

Preferably, each valid block of a particular text line has a predetermined embedding order, e.g., a column-wise raster order.

Another aspect of the invention involves a method for extracting a message embedded in text of a document. The method comprises the steps of obtaining a pixel representation of the document; forming a first representation of the document in which pixels are classified to locate blocks of pixels in which data is embedded; forming a second representation of the document to extract text lines and identify text pixels; comparing the second representation with the first representation to identify clusters of first and second colored pixels in each text line to determine the location of embedded binary elements of the message; sorting the identified first and second colored clusters in each text line in accordance with a predetermined embedding order; converting the sorted first and second colored clusters in each text line into a sequence of binary elements; and decoding the sequence of binary elements in each text line to determine an embedded character of the message.

Preferably, the sequence of binary elements in each text line is comprised of a plurality of subsets of binary elements, each of which is representative of a character of the message, and the step of decoding preferably comprises performing majority voting in each text line to determine the character of the message embedded in that text line.

The step of forming the first representation preferably comprises filtering and sharpening the pixel representation of the document. In a preferred embodiment, where the pixel representation comprises multiple color components to define corresponding multiple color planes, the filtering is applied on each color plane. The step of forming the first representation also preferably comprises classifying each of the pixels of the document as a first colored pixel, a second colored pixel, or neither. The step of forming the second representation preferably comprises thresholding the pixel representation of the document to identify text pixels.

In other aspects of the invention, apparatuses are provided for embedding a message in a text-containing document and for extracting a message so embedded. Each such apparatus is comprised of various circuits to perform message embedding or extracting operations.

In accordance with further aspects of the invention, each of the above-described methods, or steps thereof, may be embodied in a program of instructions (e.g., software) which may be stored on, or conveyed to, a computer or other processor-controlled device for execution. Alternatively, each such method may be implemented using hardware or a combination of software and hardware.

Although the data embedding approach of the present invention depends on the existence of regions meeting certain criteria, it is not dependent on reliably knowing those regions actually do contain character parts. It can therefore be employed advantageously by photocopiers. Moreover, since the color variations in which the message is embedded occur in regions that are parts of text characters, the variations can be significant from a machine point of view, but do not affect the document's appearance to a human reader.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Figure 1:
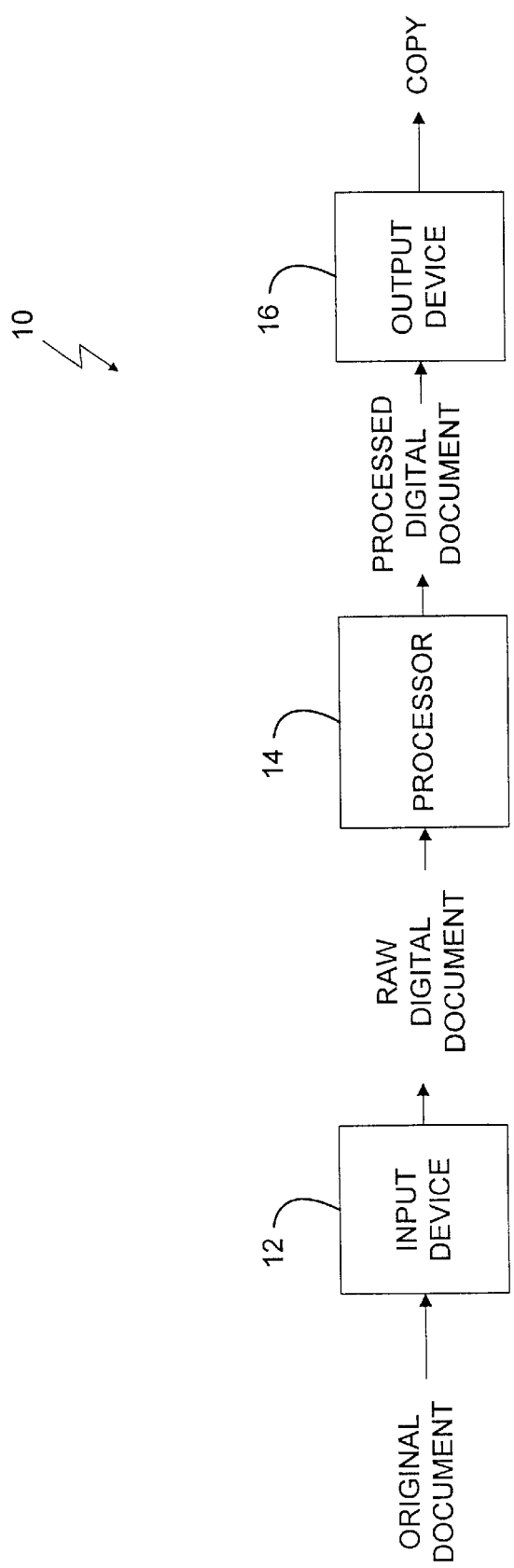
FIG. 1 is a block diagram illustrating major components in an image reproduction system, such as a photocopier, that is suitable for carrying out various aspects of the present invention.

FIG. 1 illustrates major components in a typical document reproduction system 10, such as a photocopier, in which the techniques of the present invention can be employed. An input device 12, such as a scanner or scanning component of a photocopier, generates as its output electrical signals that digitally represent the contents (image, text and/or graphics) of a document that it has scanned. If input device 12 is an optical scanner or other optical device such as a camera, then the input signals to input device 12 are optical in nature and its output representation conveys digital values of optical samples taken at locations along multiple scan lines. The digital representation may be gray scale or color, but each pixel value should include one (in the case of gray scale) or more (typically three or four in the case of color) multiple-bit components. A typical value resolution is eight bits per component per pixel.

A processor 14 performs a number of operations on the raw digital document, such as text enhancement, color correction, and, in accordance with the present invention, hidden-information embedding and/or hidden-information extracting. The various functions performed by the processor in processing the raw digital document received from input device 12 may be implemented in a variety of ways including by software and/or hardware in a photocopier or general-purpose computer.

An output device 16, such as a printer or printing component of a photocopier, receives electrical signals representing the document thus processed and renders a physical copy of the document. The printer or printing component is typically, but not necessarily, a laser printer and has multiple-bit-per-scanner-pixel value resolution for each component. This can be achieved by affording multiple-bit-per-printer-pixel value resolution and/or by affording a spatial resolution that exceeds that of the scanner.

Figure 2A:
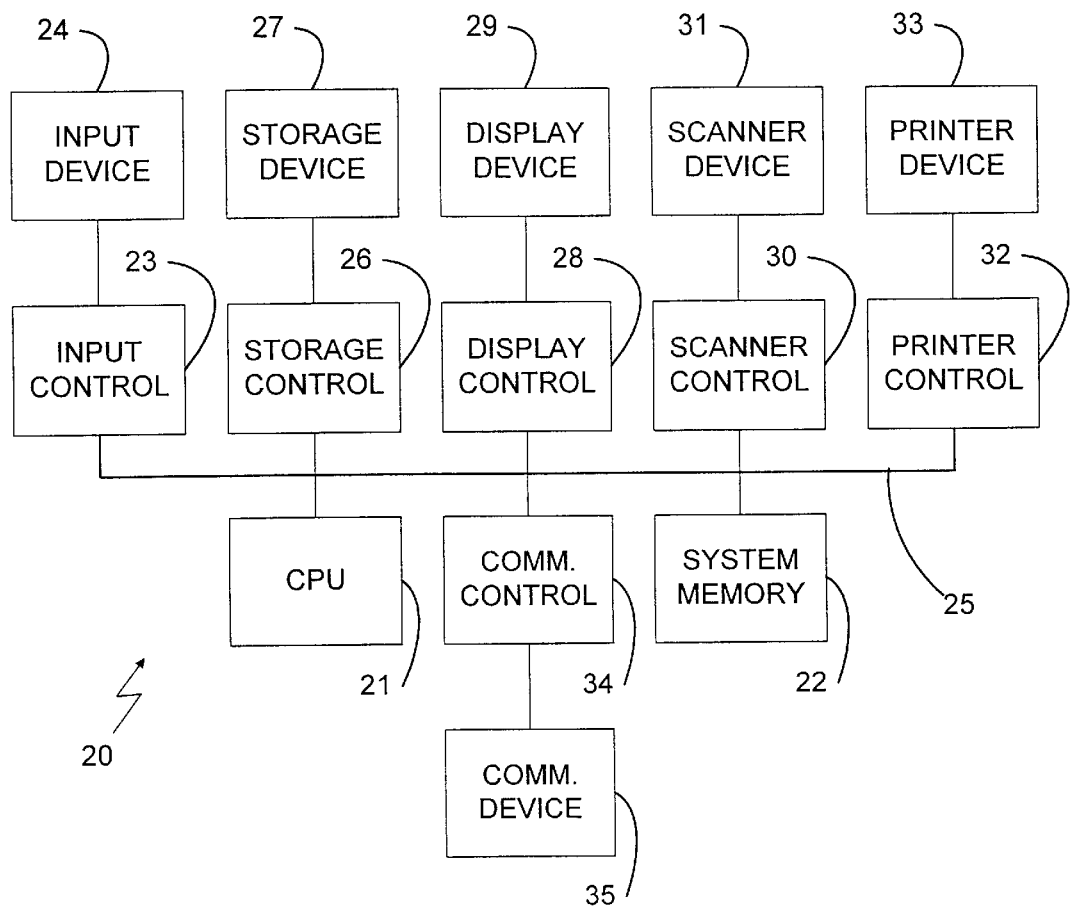
FIG. 2A is a block diagram illustrating components in a typical computer system that is suitable for carrying out various aspects of the present invention.

FIG. 2A shows the general configuration of typical computer system 20 which may be used to implement an image reproduction system according to the present invention. Central processing unit (CPU) 21 provides computing resources and controls the computer. CPU 21 may be implemented with a microprocessor or the like, and may also include a graphics processor and/or a floating point coprocessor for mathematical computations. Computer 20 further includes system memory 22 which may be in the form of random-access memory (RAM) and read-only memory (ROM).

A number of controllers and peripheral devices are also provided. Input control 23 represents an interface to one or more input devices 24, such as a keyboard, mouse or stylus. A storage control 26 is an interface to a storage device 27 that includes a storage medium such as magnetic tape or disk, or an optical medium that may be used to record programs of instructions for operating systems, utilities and applications which may include embodiments of programs that implement various aspects of the present invention. Display control 28 provides an interface to display device 29 which may be a cathode ray tube (CRT) or thin film transistor (TFT) display. Scanner control 30 represents an interface to scanner device 31 such as an optical scanner.

Printer control 32 represents an interface to printer device 33 that is an output device like a laser printer. Communications control 34 interfaces with communication device 35 which may be a modem or other network connection. Programs that implement various aspects of this invention may be transmitted to computer system 20 from a remote location (e.g., a server) over a network.

Devices like scanner 31 may serve as input device 12 and devices like printer 33 may serve as output device 16. Other components shown in the figure may be used to implement processor 14.

In the embodiment shown, all major system components connect to bus 25 which may represent more than one physical bus. For example, some personal computers incorporate only a so-called Industry Standard Architecture (ISA) bus. Other computers incorporate an ISA bus as well as a higher bandwidth bus conforming to some bus standard such as the VESA local bus standard or the PCI local bus standard. A bus architecture is not required to practice the present invention.

The functions required to practice various aspects of the present invention can be implemented in processor 14 in a wide variety of ways including with software which can be loaded into the computer or photocopier from a storage device, such as device 27, and executed by a microprocessor, such as CPU 21. More broadly, such software may be conveyed by a variety machine-readable medium including magnetic tape or disk, optical disc, infrared signals, and baseband or modulated communication paths throughout the electromagnetic spectrum including from supersonic to ultraviolet frequencies.

Figure 2B:
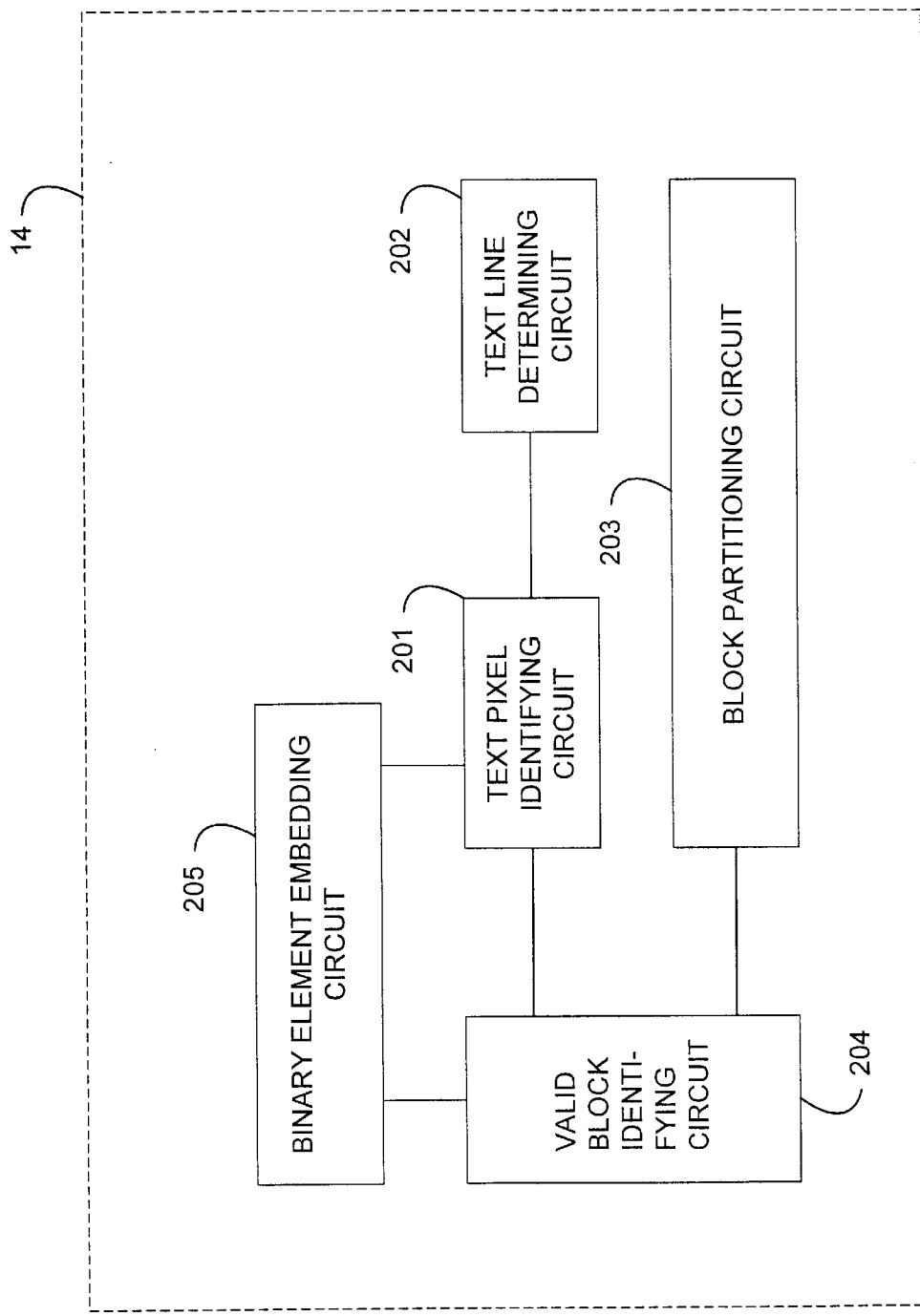
FIG. 2B is a block diagram illustrating various components which may be used to implement a processor that performs data embedding functions in accordance with embodiments of the invention.
Figure 2C:
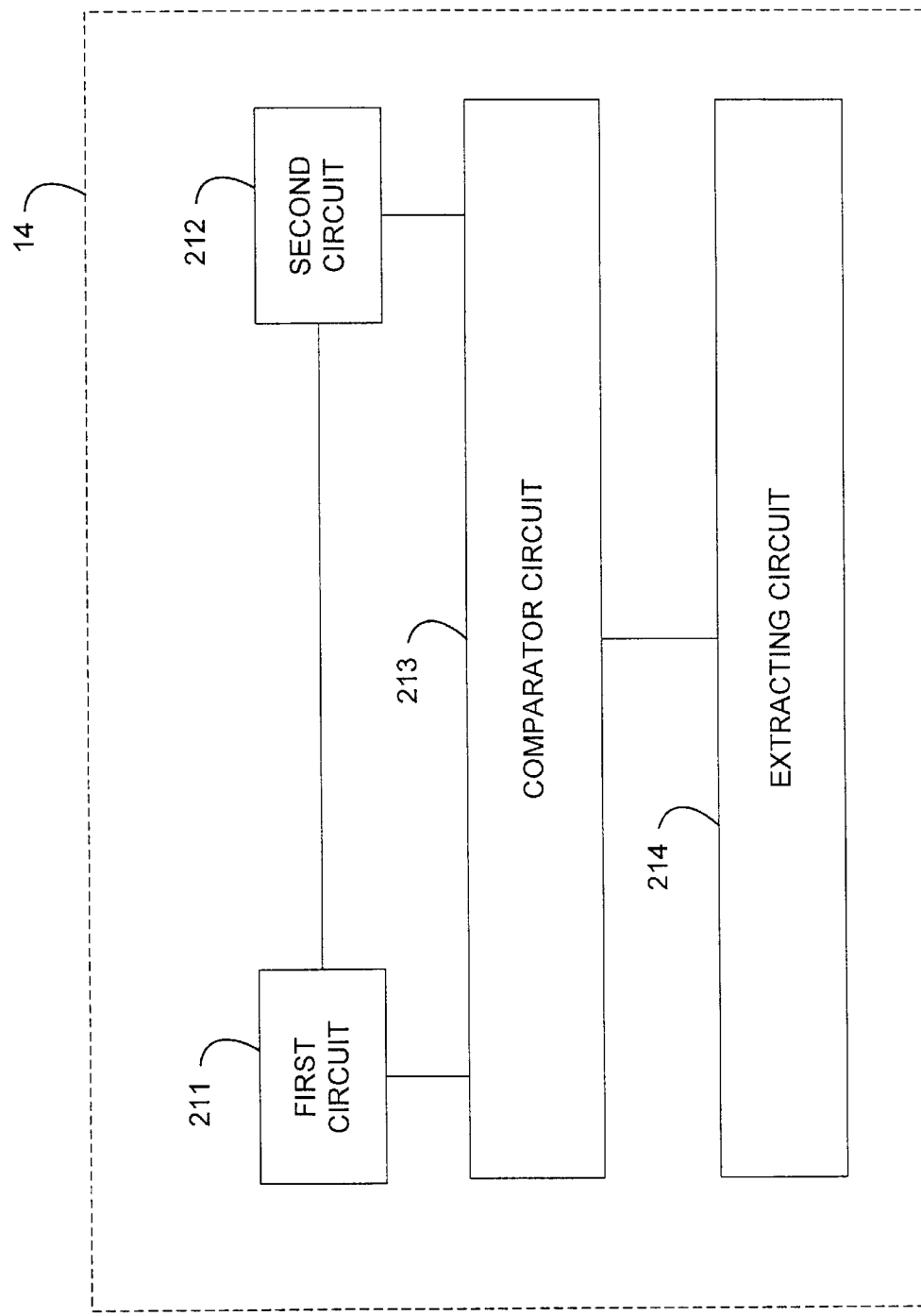
FIG. 2C is block diagram illustrating various components which may be used to implement a processor that performs data extracting functions in accordance with embodiments of the invention.

Processor 14 can also be implemented with discrete logic circuits, one or more application specific integrated circuits (ASICs), digital signal processors, program-controlled processors, or the like. As shown schematically in FIG. 2B, these components may be configured to form circuits, such as a text pixel identifying circuit 201, a text line determining circuit 202, a block partitioning circuit 203, a valid block identifying circuit 204, and a binary element embedding circuit 205 that perform functions associated with the data embedding aspects of the invention. These components may also be configured to form circuits that perform functions associated with data extracting, as shown schematically in FIG. 2C. Such circuits may include, for example, circuits 211 and 212 that form various representations of the document, a comparator circuit 213 that compares the two representations, and an extracting circuit 214. In the form of hardware, processor 14 can be embodied in the computer or photocopier or on an option card that can be inserted into an available card slot. The functions performed by the various circuits identified above are described in more detail below.

Inasmuch as the data embedding and/or extracting techniques of the present invention may be implemented using hardware, software, or combination thereof, it is to be understood that the block and flow diagrams show the performance of certain specified functions and relationships thereof. The boundaries of these functional blocks have been arbitrarily defined herein for convenience of description. Alternate boundaries may be defined so long as the specified functions are performed and relationships therebetween are appropriately maintained. The diagrams and accompanying description provide the functional information one skilled in the art would require to fabricate circuits or to write software code to perform the processing required.

Figure 3:
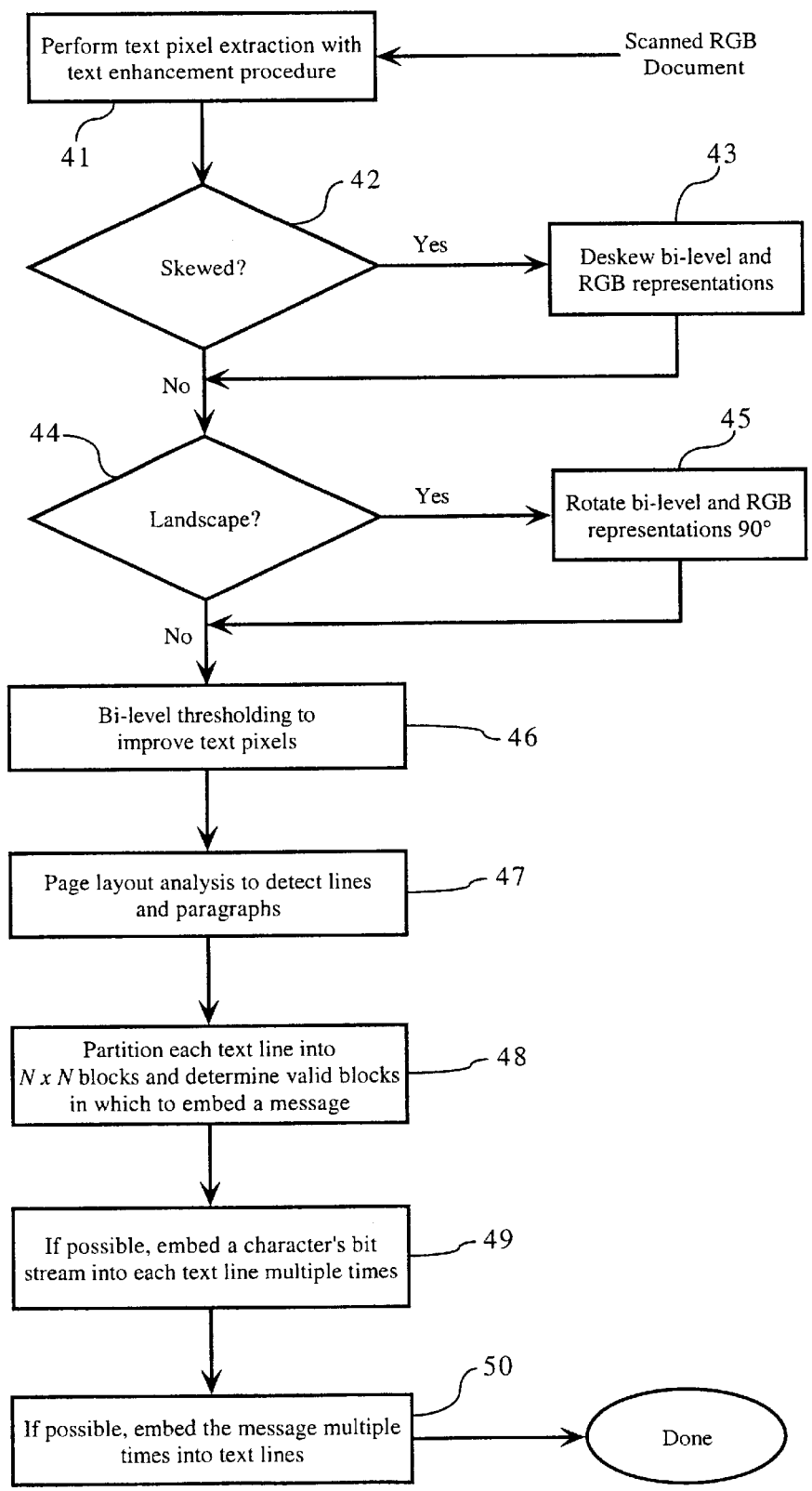
FIG. 3 is a flow diagram illustrating an exemplary set of operations of a data embedding process, in accordance with embodiments of the invention.
Figure 4:
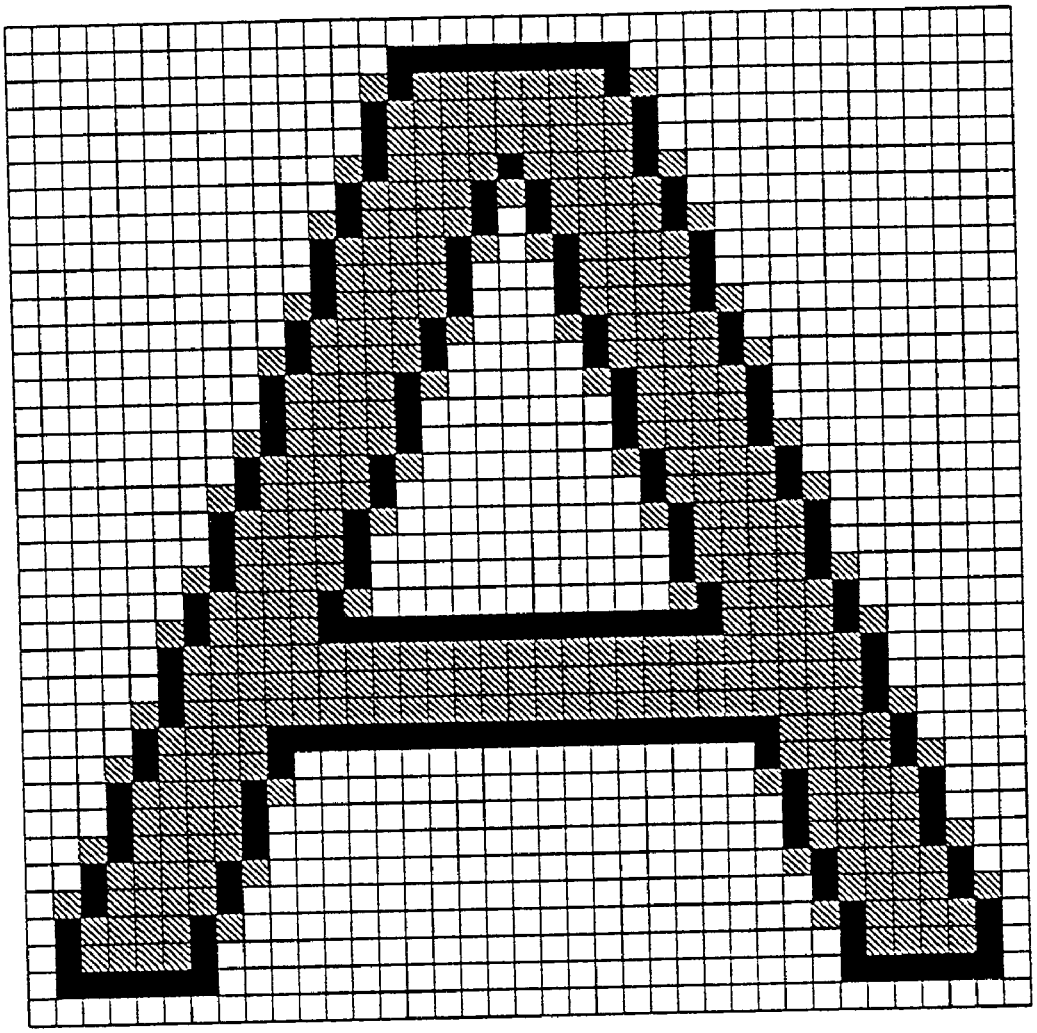
FIG. 4 is a schematic diagram that illustrates character outlining in accordance with aspects of the invention.

FIG. 3 depicts an exemplary set of functions of a data embedding process that processor 14 may perform in accordance with the invention. The data embedding process of FIG. 3, as well as the text extraction process of FIG. 4 is primarily directed to dark text documents, although, with some modifications, it can be used for other types of text documents as well.

Step 41 represents a text extraction operation that involves the identification of those pixels representing the text portion of a scanned document. The text pixel extraction is preferably performed with a text enhancement procedure which provides an indication of where text pixels are located so that data will not be embedded into image or graphics regions, if there are any. Other methods may be employed, in conjunction with the present invention, to embed data into image or graphics regions, if desired.

In step 41 the pixel representation of the scanned document is analyzed row-by-row to identify regions whose contents are predominately part of text characters. This operation begins by considering the scanned pixel representation as a whole. Processor 14 analyzes and identifies pixels considered to be located in text regions. The criterion for identifying such pixels in gray-scale-only documents may be that their brightness or luminance values must be less than a certain threshold. That threshold may be fixed, or it may be determined by taking a histogram of the document's pixel values and selecting all pixels whose brightness/luminance values are below, say, the $25^{th}$ percentile. For a color document, a further requirement that the color saturation be below a certain threshold would typically be imposed. Again, the threshold may be fixed, or it can be derived from, say, histogram values. Also, the saturation threshold applied to a given pixel may depend on that pixel's intensity. Other criteria may also be used to select text regions.

The text enhancement operation of step 41 preferably includes assigning edge labels in preperation for enhancing the legibility of text characters by blackening their outlines. In FIG. 4 the pixels with the black fill represent those that have been identified as meeting certain criteria indicitive of text edges. U.S. Pat. No. 6,227,725, entitled "Text Enhancement for Color and Gray-Scale Documents," and filed on Aug. 18, 1998, the contents of which is incorporated by reference herein, describes a technique for assigning such labels. The labeled edge text pixels are used to locate the text regions which are further thresholded to generate a bi-level representation resulting in the cross-hatched pixels, shown in FIG. 4, which are dark enough to be considered text regions.

In step 42, it is determined if the original document is skewed, that is, if text is canted, perhaps because the original document was oriented improperly on the scanner. If so, processor 14 reorients the canted text and generates a "de-skewed" pixel representation of both the scanned (RGB) representation and the bi-level representation in step 43. U.S. Pat. No. 6,373,590, entitled "Method and Apparatus for Slant Adjustment and Photo Layout," and filed on Feb. 4, 1999, the contents of which is incorporated by reference herein, describes a technique for determining such a skew angle and de-skewing.

In step 44, processor 14 determines if the document is in landscape or portrait form, and rotates it to portrait in step 45, if necessary. Such rotation, if necessary, can be performed in a row-based fashion using the technique described in U. S. Pat. No. 6,373,590.

A bi-level thresholding operation is performed in step 46 to improve text pixels. De-skewing may create blurry pixels. This thresholding step converts some of these blurry pixels, depending on threshold value, to foreground and also introduces new pixels to fill "holes" in close proximity to other text pixels.

Figure 5:
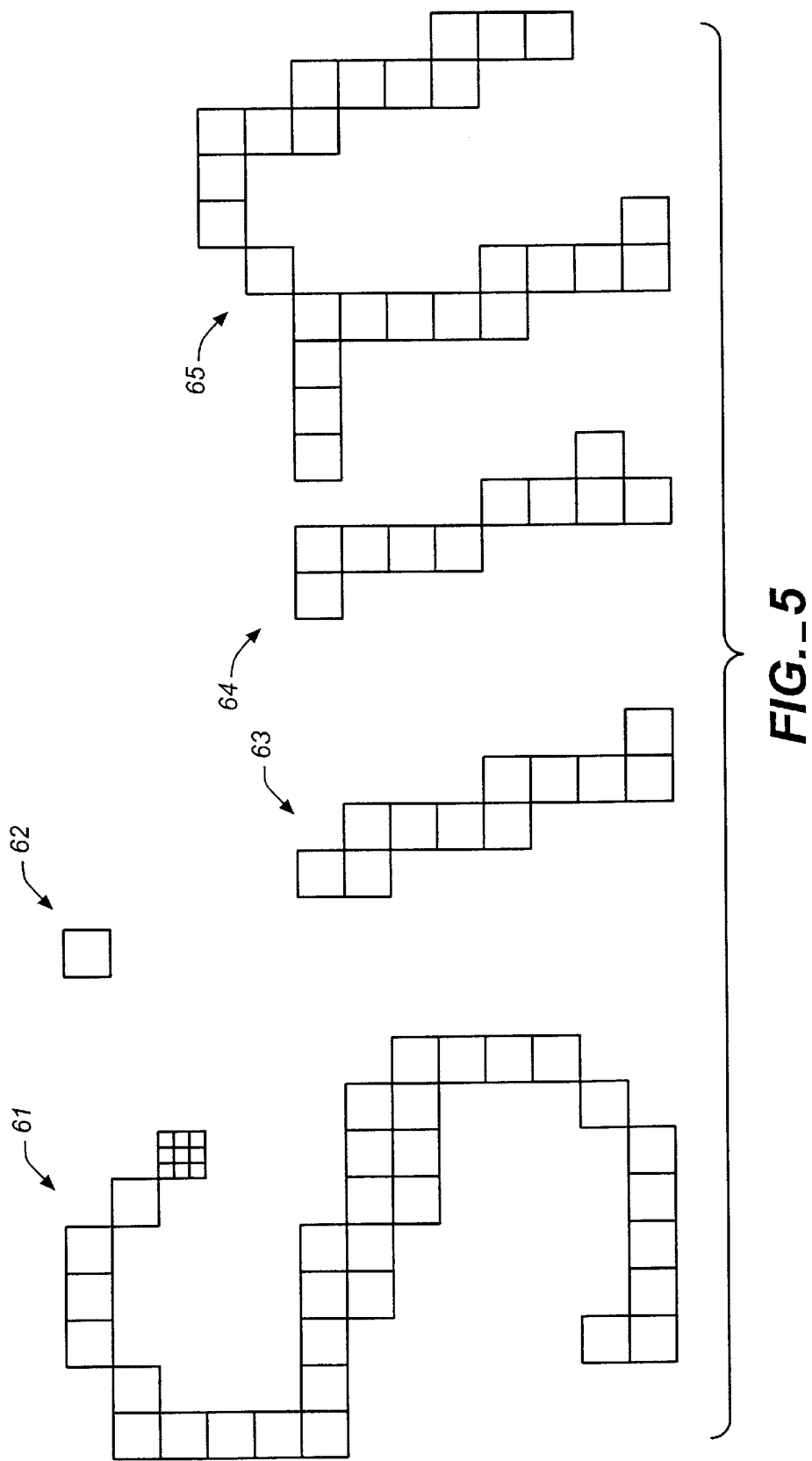
FIG. 5 is a schematic diagram that illustrates pixel identification.

A page layout operation is performed in step 47. This involves grouping the text pixels into words, lines and paragraphs to construct a document layout which is used to embed a message in text pixels. Patterns of identified text pixels are divided into sets of contiguous blocks of pixels. FIG. 5 illustrates a pattern that can result from the three-letter sequence "Sim." Each block or square in FIG. 5 corresponds to multiple pixels, as illustrated by the subdivision of one of the blocks in the letter "S", and the blocks of pixels thus identified depict five such sets, identified by the reference numerals 61, 62, 63, 64 and 65. These sets or components correspond roughly to individual characters. However, a pair of characters can be in sufficiently close proximity to result in a single component. It is also possible, as illustrated in FIG. 5, that a single character can be represented by more than one component. For example, the "i" in FIG. 5 results in two components. Likewise, the "m" also results in two components. This is acceptable because the purpose for grouping text-region pixels into components is not to identify characters but rather to provide input into a repeatable way of establishing a reference position. Still, depending on the resolution, components comprising fewer than a certain number of pixels (e.g., eight) are not used in further processing, nor are components that are more than a certain area (e.g., two hundred pixels wide or fifty pixels high for a resolution of 600 dpi).

Figure 6:
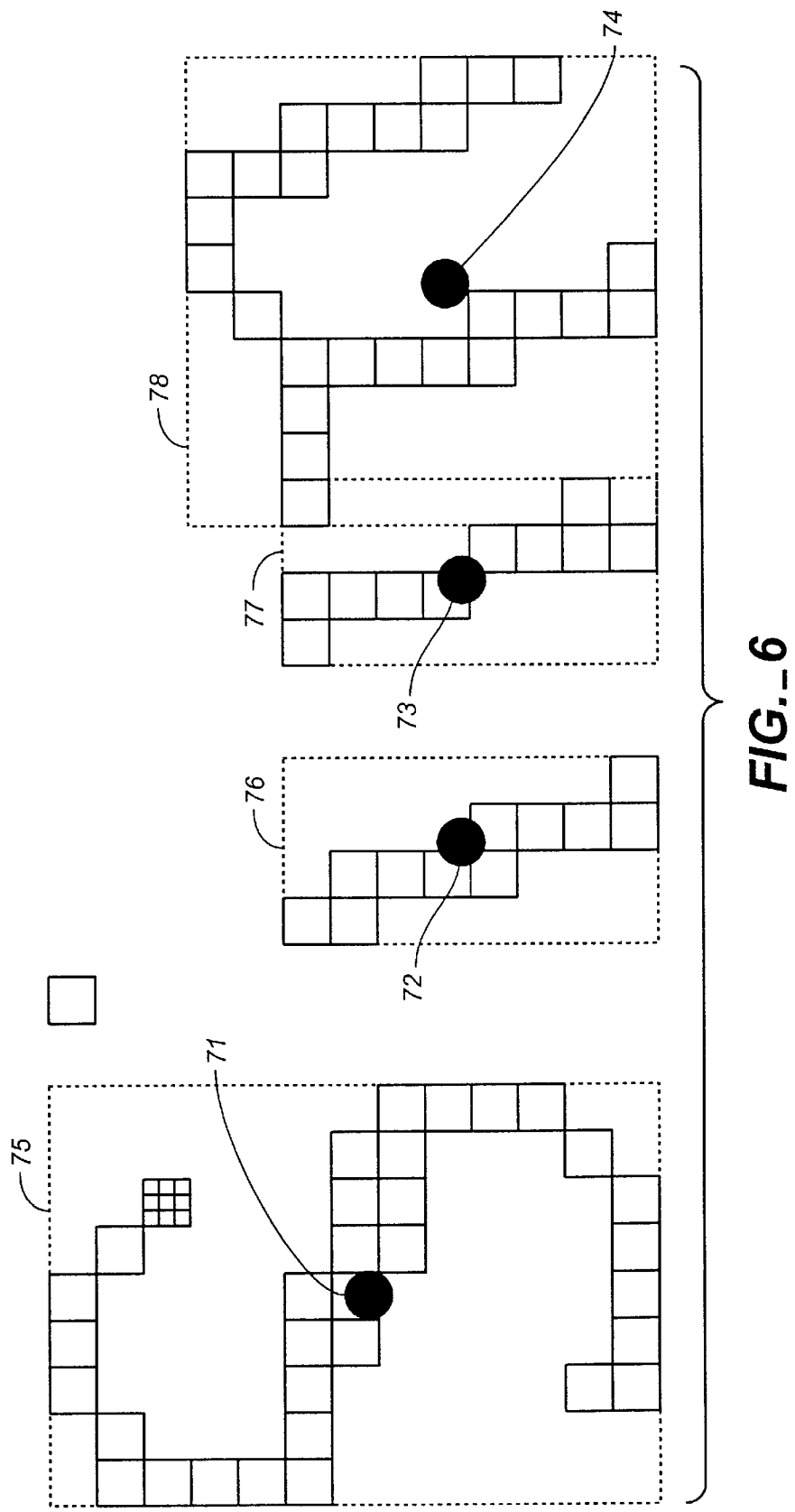
FIG. 6 is a schematic diagram that depicts centroids of connected sets of such pixels.
Figure 7:
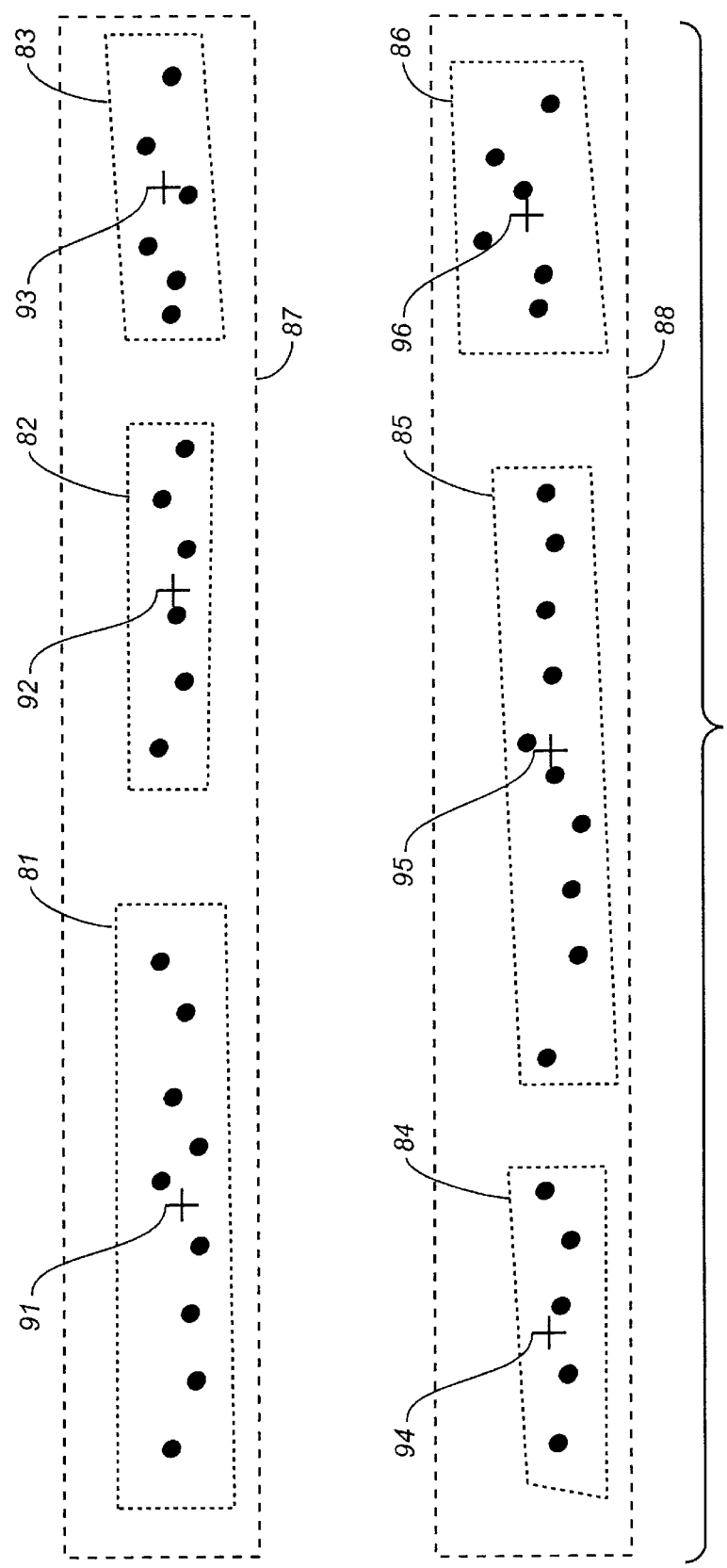
FIG. 7 is a schematic diagram showing the grouping of those centroids into word- and line-sized sets.

As FIG. 6 illustrates, processor 14 then determines the (sub-pixel-resolution) centroids 71, 72, 73 and 74 of the remaining components' respective smallest enclosing rectangles 75, 76, 77 and 78. As FIG. 7 illustrates, centroids of the remaining components' respective smallest enclosing rectangles are determined and then grouped into sets 81, 82, 83, 84, 85, and 86 of centroids spaced from adjacent centroids in the set by less than a minimum inter-word spacing. That minimum spacing usually bears a predetermined ratio to the average size of the component bounding boxes. These sets are referred to as "words" because they usually correspond to actual text words, although the correspondence is not always exact. These word sets are then divided into groups 87 and 88 of word sets separated from their neighbors by less than a minimum inter-line spacing. Although the correspondence of components to text characters is somewhat rough, the correspondence of the thus-derived word sets to actual words is less so, and the correspondence of line sets of those centroids to text lines is ordinarily quite good in the following sense: although the spacings between words in a line of actual text will occasionally be so great as to result in two line sets of centroids, separate text lines will nearly always result in separate line sets.

Figure 8:
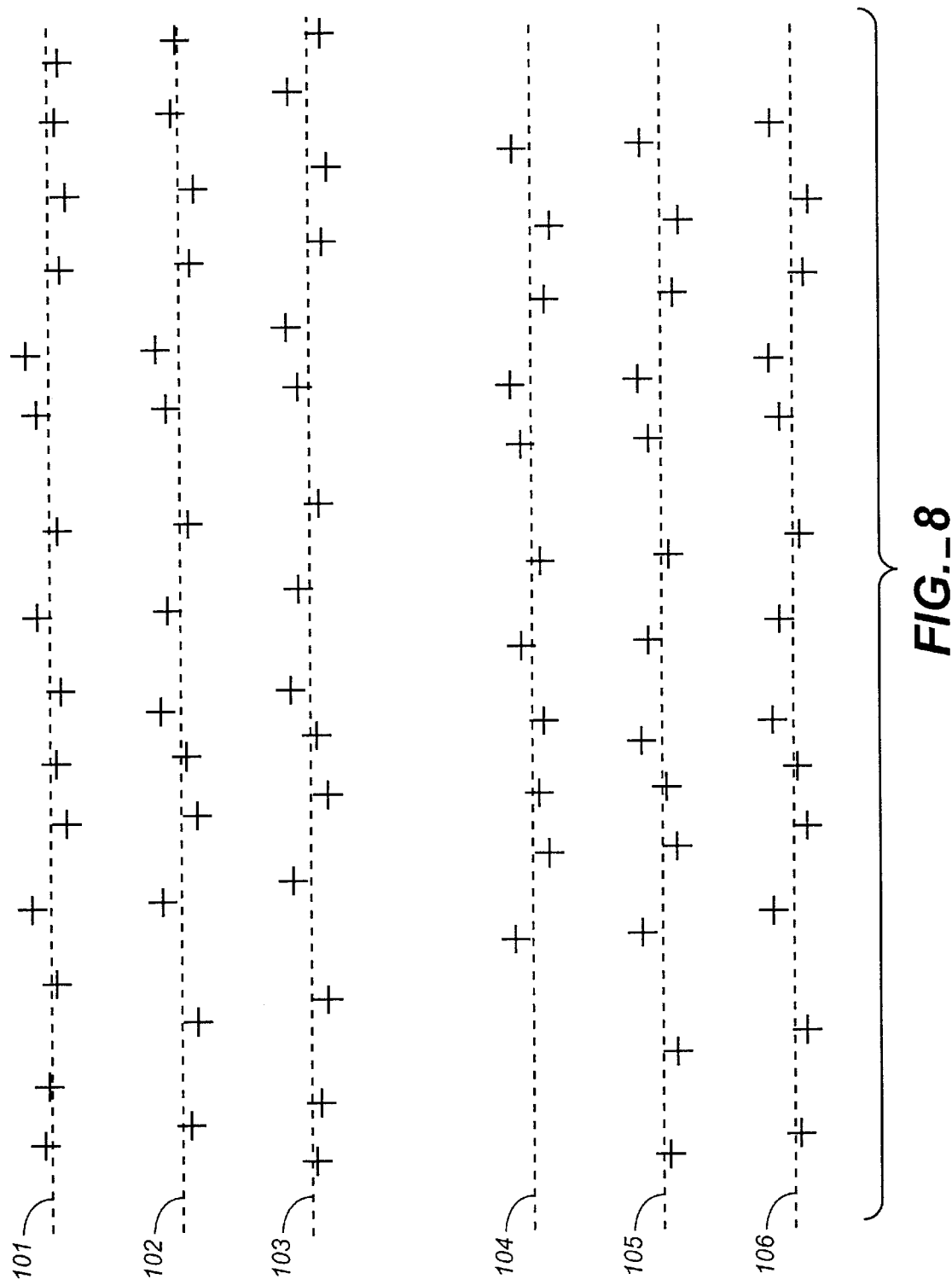
FIG. 8 is a schematic diagram depicting lines corresponding to line-sized centroid sets.

With the line sets thus determined, word centroids 91, 92, 93, 94, 95, and 96 are computed from each respective word sets' constituent component centroids. As FIG. 8 illustrates, respective line sets' word centroids correspond to lines 101, 102, 103, 104, 105 and 106.

Figure 9:
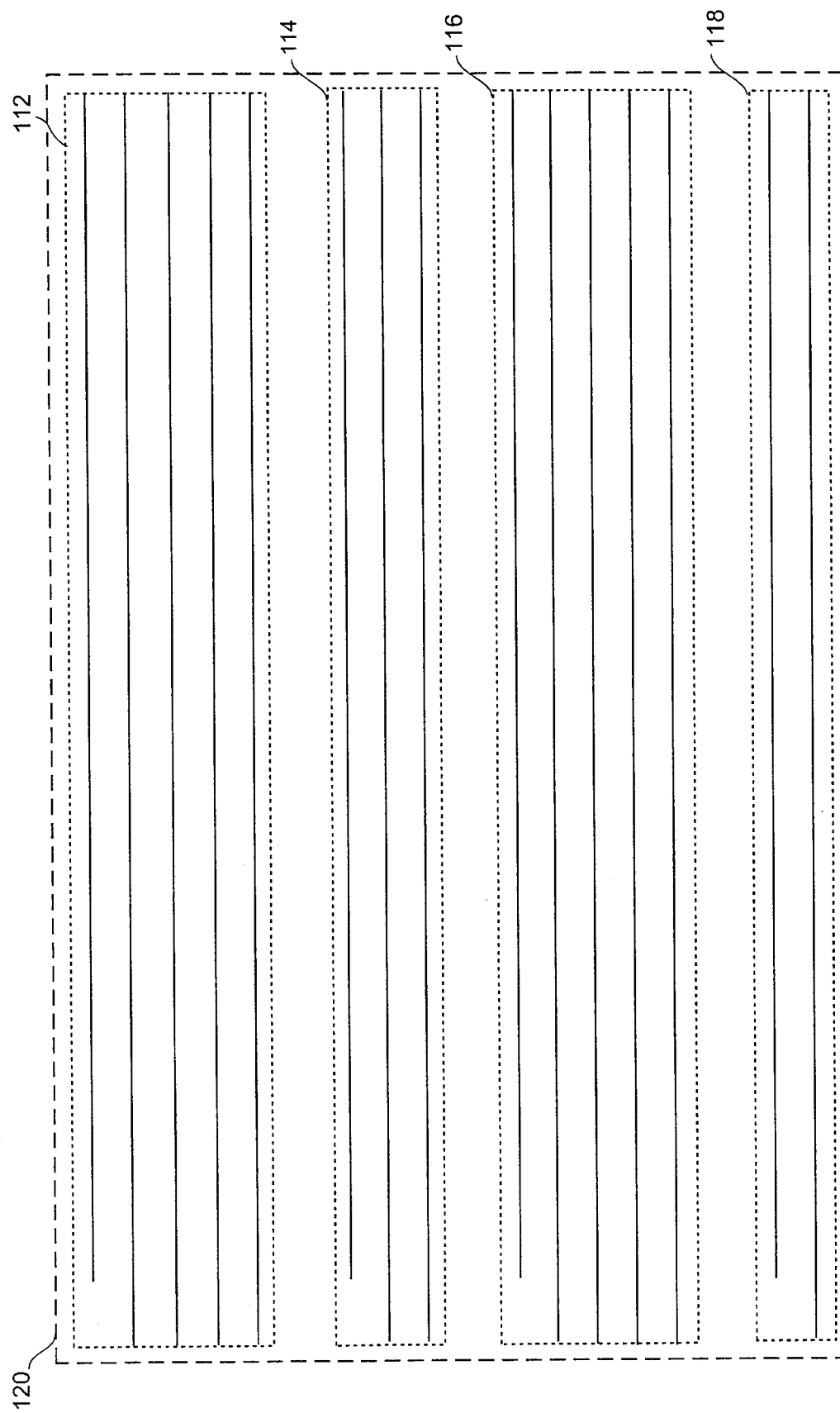
FIG. 9 is a schematic diagram illustrating a bounding box by which the grid of cells is established.

Processor 14 then computes line segments delimited by the end component centroids in respective line sets. Each line segment that is spaced by more than a predetermined inter-paragraph minimum from the preceding line, or that is indented by more than a predetermined minimum indentation from its fellows, is considered to begin a new paragraph, so the line segments of a page 120 are divided into sets 112, 114, 116, and 118, as shown in FIG. 9. Each text line forms its own grid system.

With text extraction, de-skewing and page layout analysis completed, processor 14 embarks upon text-line-partitioning and message-embedding operations which includes generating a bit stream to embed, identifying embedding sites, and the actual embedding of bits, as described below.

The message to be embedded may comprise one or more characters, such as alphanumeric characters, or may be represented by unicode, and can be of any type desired. In fact, any character that can be represented by a unique bit stream can be used in the message, although the number of characters in the message should not exceed the number of text lines in the document. For example, the message may include the date on which the copy was made, the make and/or the serial number of the photocopier. Typically, the method for recovering the raw message will be publicly available, but the raw message may be encrypted so as to be decipherable by only the manufacturer, owner or other authorized person.

In step 48, each text line is partitioned into a plurality of blocks (e.g., N×N blocks, where N=10 at 600 dpi). Some of these blocks are identified as valid sites based on their foreground content and neighboring blocks. In particular, a block is identified as a valid block if that block contains a certain predetermined percentage (e.g., 75%) of text pixels and that block is not an immediate neighbor of an already identified valid block. That is, a valid block's eight closest neighboring blocks cannot be labeled as valid even if they satisfy the threshold text pixel percentage. This requirement reduces mistakes that may occur during the extraction process. Also, requiring that a valid block have a predetermined percentage (as opposed to a predetermined number) of text pixels provides resolution and block size independence. Once identified, the valid blocks are used to embed a plurality of bit streams, each of which represents a character of the message.

The individual bits of the binary message are themselves each made up of a plurality of bits (three in a preferred embodiment), each of which is embedded into a specific one of these: valid sites. In a preferred embodiment, the triplet {0, 1, 0} is used to represent a 1, and the triplet {1, 0, 1} triplet is used to represent a 0. Colored or certain shaped pixel clusters can be used to represent 1's and 0's within the text regions. In a preferred embodiment, a 1 is embedded by labeling text pixels of a valid block by a dark blue color and a 0 is embedded by labeling text pixels of a valid block by a dark red color. These colors are chosen because they are not easily discernible by human eye. Other colors satisfying this criterion may also be used. Appropriate colors for the reproduction system are determined experimentally.

Figure 11:
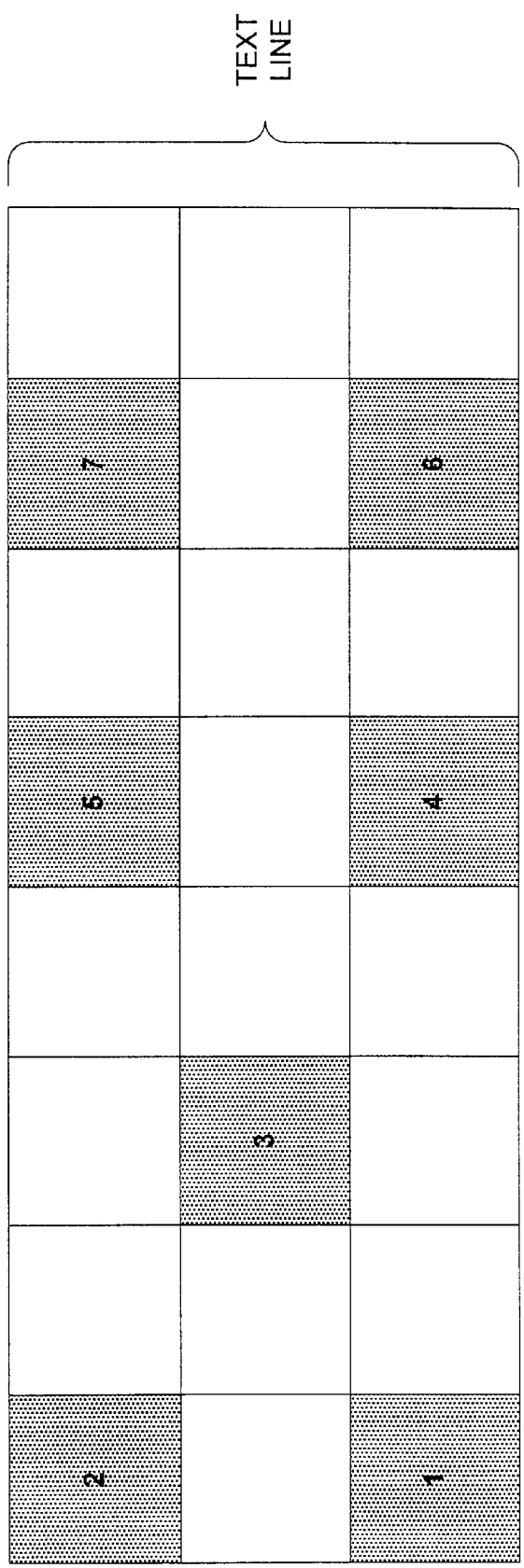
FIG. 11 is a schematic diagram of blocks of a portion of a text line, with the hatched blocks denoting valid blocks.

In step 49, processor 14 obtains the group of blocks for each text line, one at a time. The valid blocks in each text line are visited in a pre-determined order to embed bits, as described below. In a preferred embodiment, valid blocks in a given text line are visited in a column-wise raster order until all such blocks have been visited. FIG. 11 illustrates a group of blocks in a portion of a text line. In the figure, each valid block (denoted by hatching) is identified by a number indicating the order in which it is visited in the data embedding process. As an example, to embed message bits {0, 1} in these blocks, the bit stream {1, 0, 1, 0, 1, 0} is embedded into the valid block sites. The table below shows the order in which each of these bits is to be embedded into the corresponding block shown in FIG. 11.

| Bit | 1 | 0 | 1 | 0 | 1 | 0 |
|---|---|---|---|---|---|---|
| Block No. | 1 | 2 | 3 | 4 | 5 | 6 |

In a preferred embodiment, only one character (represented by one or more bits of the binary message) is embedded in a given text line, but that character's bit stream is repetitively embedded in that text line, as long as there are enough valid blocks in that line to do so. Repetition improves the robustness of the data extraction algorithm.

This embedding operation is repeated for each text line. That is, the bits for the next character are embedded in the valid blocks, in next text line, and so on, as described above. The embedding process continues until all text lines have been considered.

It should be noted that in addition to repeatedly embedding a character in one text line, a character may also be embedded in more than one text line, depending on the number of text lines in the document and the number of characters in the message. That is, if possible, the message is embedded multiple times into the text lines of the document (step 50). For example, if there are 100 text lines in the document and the message is 10 characters, then each character's bit stream and hence the message is embedded 10 times into the document. Thus, in this situation, after the sequence of bits representing the last character in the message has been embedded in text line 10, the embedding process would continue at text line 11 wherein the bit sequence of the first character would be embedded.

Figure 10:
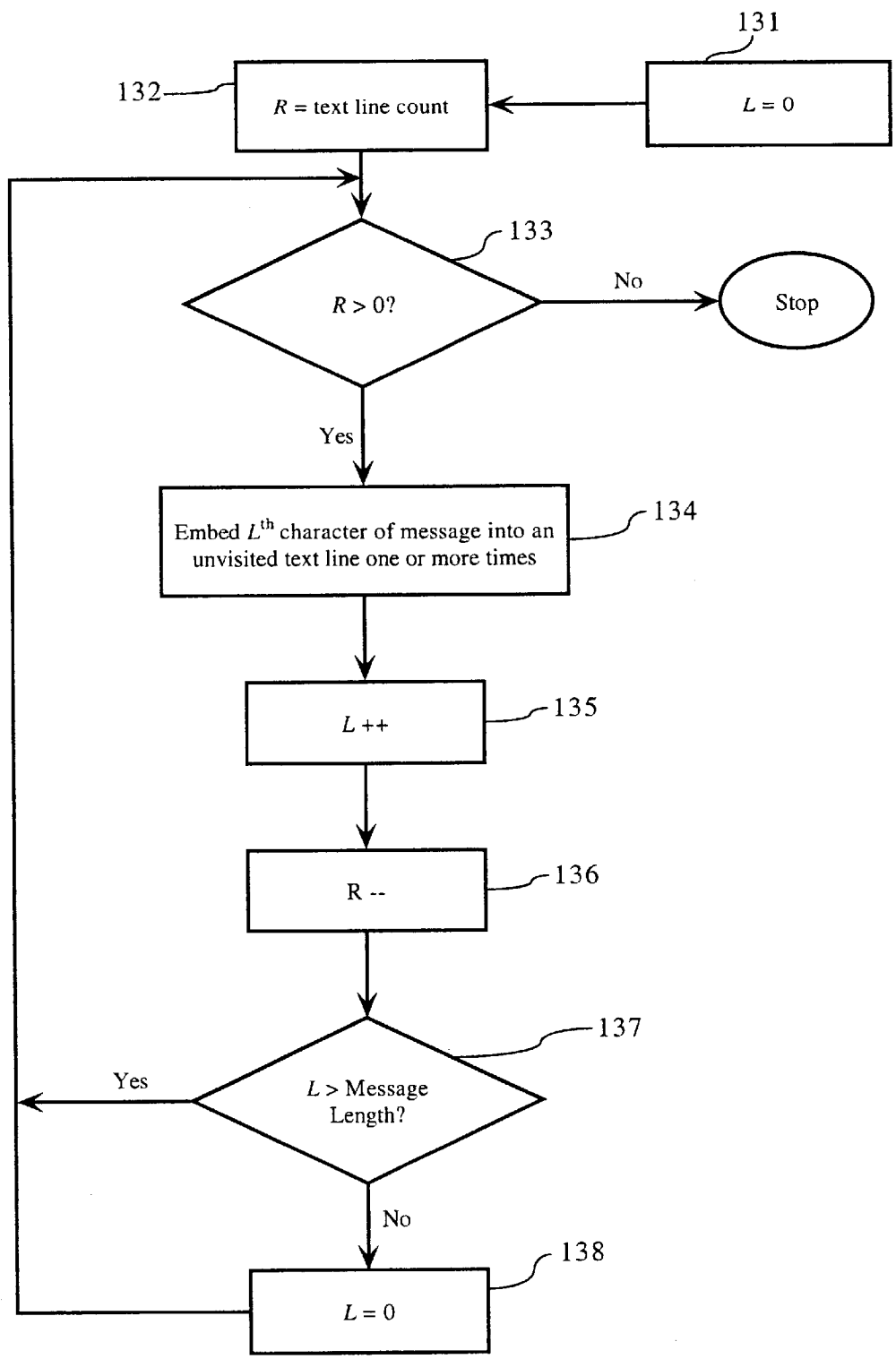
FIG. 10 is a flow diagram of a portion of the data embedding process, in accordance with embodiments of the invention.

The operations of steps 49 and 50 are further illustrated with the flow diagram of FIG. 10. With text character variable L initialized to zero and variable R defined as the text line count in steps 131 and 132 respectively, data embedding begins if it is determined in step 133 that R is greater than zero. In that case, the $L^{th}$ character of the message is embedded into an unvisited text line one or more times in step 134. Variable L is then incremented by one and variable R is decremented by one in steps 135 and 136 respectively. Next, it is determined if L is greater than the message length M in step 137. If so, the algorithm returns to step 133; if not, L is reinitialized to zero in step 138, and then the algorithm returns to step 133. The embedding process continues until it is determined in step 133 that R is less than or equal to zero, in which case the process terminates.

Figure 12:
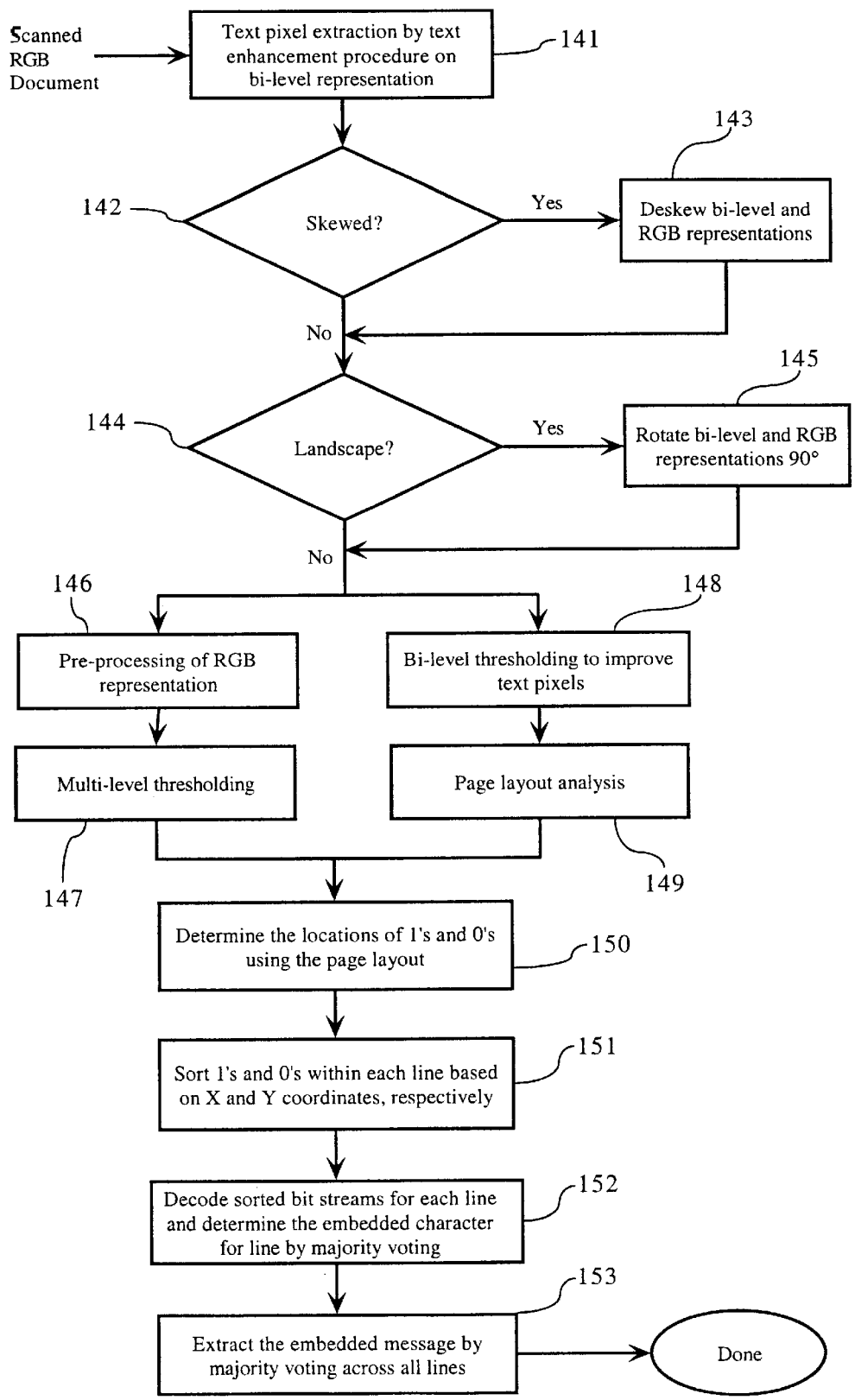
FIG. 12 is a flow diagram of the data extraction process, in accordance with embodiments of the invention.

To recover such an embedded message, the copy of the document in which the message is embedded is first scanned to obtain a pixel representation of the document. An extracting process, which generally comprises pre-processing, thresholding, page layout analysis and message extraction steps, is then performed on this pixel representation. The data extraction algorithm locates color-coded blocks that correspond to embedded 1's and 0's on the scanned document. The main steps of the extraction process are shown in FIG. 12.

Initially, a text pixel extraction operation is performed on a bi-level representation of the document using a text enhancement procedure (step 141), as previously described in connection with the embedding process.

Next, it is determined in step 142 whether the document is skewed. If so, it is de-skewed in step 143. Then, it is determined in step 144 if the document is in landscape form. If so, in step 145 it is rotated 90° to portrait which is the mode in which the system embeds and therefore extracts data.

Next, in step 146, a pre-processing operation is performed which reduces noise in the scanned document that is caused scanner mechanics and CCD characteristics. The pre-processing step includes median filtering and sharpening. The median filter is applied on each of the red (R), green (G), and blue (B) planes of the scanned document separately. These median filtered planes are sharpened independently to increase the contrast between color-coded regions and text regions. The pre-processed planes are then put back together to form a pre-processed RGB representation.

In step 147 a multi-level thresholding algorithm classifies pixels of this pre-processed document into three classes: (1) pixels in which 1's are embedded, (2) pixels in which 0's are embedded, and (3) all other pixels. During this thresholding step a priori knowledge of dark blue (1's) and dark red (0's) colored pixel labels are used to locate the blocks in which data is embedded.

In parallel with the pre-processing step, the original scanned document is bi-level thresholded in step 148 to identify the text pixels. This thresholded representation is further analyzed based on pixel components' shape and size statistics. This filtered representation is used to perform page layout analysis, i.e., to extract the words, lines and paragraphs of the scanned document, in step 149, as previously described.

This layout is superimposed on the detected blue and red colored pixels in step 150. Clusters of blue and red colored pixels are formed within each text line. In step 151, cluster centroids are sorted along x and y coordinates, respectively. A priori knowledge of embedding order is used during the sorting process. These sorted pixel clusters are converted to streams of 1's and 0's.

These bit streams are decoded within each text line, and individual characters are determined from them. Since only one character is embedded (albeit multiple times) in a given text line, ideally all of the characters extracted from a given line should be the same. However, in practice, this is not always the case. Thus, the actual character embedded in a given line is determined by a majority-voting scheme. That is, of all the characters extracted from a given line, the one extracted the most times is deemed to be the character that was actually embedded. These functions are depicted in step 152.

This process of decoding the bit streams within each line and determining the character embedded therein is repeated over all of the text lines. By knowing the length of the message (i.e., M), majority voting among mod M lines can be performed. This type of analysis provides the embedded message with length M (step 153). While it is possible to extract the embedded message without knowing the message length M, having a priori knowledge of M reduces the possibility of error.

As the foregoing description demonstrates, the present invention provides a robust technique for embedding a message in text regions of a document, and for extracting a message so embedded. The embedding and extracting techniques may be implemented in a photocopier or on a personal computer using software or hardware.

While the invention has been described in conjunction with several specific embodiments, many further alternatives, modifications, variations and applications will be apparent to those skilled in the art that in light of the foregoing description. For example, a low-resolution rendition of the scanned document may be used to perform the text pixel extraction, skew angle determination, de-skewing, portrait/landscape detection and page layout analysis to speed up the process and reduce computational overhead. Thus, the invention described herein is intended to embrace all such alternatives, modifications, variations and applications as may fall within the spirit and scope of the appended claims.

What is claimed is:

1. A method for embedding a message in a text-containing document, comprising the steps of:
   obtaining a pixel representation of the document;
   identifying text pixels of the document;
   determining each text line of the document;
   partitioning each determined text line into a plurality of blocks;
   identifying each block as valid if that block contains at least a predetermined percentage of text pixels and that block is not an immediate neighbor of a block already identified as valid; and
   embedding a binary element in each valid block by labeling text pixels within that block with a first color or a second color to embed the message in the document.

2. The method of claim 1, wherein the step of embedding is carried out text line-by-text line.

3. The method of claim 2, wherein the message comprises at least one character which comprises at least one binary element, and only one character is embedded in each text line.

4. The method of claim 3, wherein a character embedded in a particular text line is repetitively embedded in that text line.

5. The method of claim 3, wherein a character is embedded in more than one text line.

6. The method of claim 2, wherein each valid block of a particular text line has a predetermined embedding order.

7. The method of claim 6, wherein the predetermined order is a column-wise raster order.

8. The method of claim 2, wherein the message comprises at least one character, each of which is comprised of a first binary element sequence, each of the first binary elements being comprised of a second binary element sequence.

9. A method for extracting a message embedded in text of a document, comprising the steps of:
   obtaining a pixel representation of the document;
   forming a first representation of the document in which pixels are classified to locate blocks of pixels in which data is embedded;
   forming a second representation of the document to extract text lines and identify text pixels;
   comparing the second representation with the first representation to identify clusters of first and second colored pixels in each text line to determine the location of embedded binary elements of the message;
   sorting the identified first and second colored clusters in each text line in accordance with a predetermined embedding order;
   converting the sorted first and second colored clusters in each text line into a sequence of binary elements; and
   decoding the sequence of binary elements in each text line to determine an embedded character of the message.

10. The method of claim 9, wherein the sequence of binary elements in each text line is comprised of a plurality of subsets of binary elements, each of which is representative of a character of the message, and wherein the step of decoding comprises performing majority voting in each text line to determine the character of the message embedded in that text line.

11. The method of claim 9, wherein the step of forming the first representation comprises filtering and sharpening the pixel representation of the document.

12. The method of claim 11, wherein each pixel of the pixel representation of the document comprises multiple color components to define corresponding multiple color planes, and wherein the filtering is applied on each color plane.

13. The method of claim 12, wherein the step of forming the first representation comprises classifying each of the pixels of the document as a first colored pixel, a second colored pixel, or neither.

14. The method of claim 9, wherein the step of forming the second representation comprises thresholding the pixel representation of the document to identify text pixels.

15. An apparatus for embedding a message in a text-containing document, the apparatus comprising:
   a scanner that outputs a pixel representation of the document;
   a text pixel identifying circuit, in communication with the scanner;
   a text line determining circuit, in communication with the text pixel identifying circuit;
   a block partitioning circuit in communication with the text pixel identifying circuit and the text line determining circuit;
   a valid block identifying circuit, in communication with the text pixel identifying circuit and the block partitioning circuit, the valid block identifying circuit being configured to identify each block as valid if that block contains at least a predetermined percentage of text pixels and that block is not an immediate neighbor of a block already identified as valid; and
   a binary element embedding circuit in communication with the text pixel identifying circuit and the valid block identifying circuit.

16. The apparatus of claim 15, wherein the text pixel identifying circuit, the text line determining circuit, the block partitioning circuit, the valid block identifying circuit, and the binary element embedding circuit are embodied as a single integrated circuit.

17. The apparatus of claim 15, wherein the text pixel identifying circuit, the text line determining circuit, the block partitioning circuit, the valid block identifying circuit, and the binary element embedding circuit are physically distinct circuits.

18. An apparatus for extracting a message embedded in text of a document, the apparatus comprising:
   a scanner that outputs a pixel representation of the document;
   a first circuit, in communication with the scanner, that forms a first representation of the document in which pixels are classified to locate blocks of pixels in which data is embedded;
   a second circuit, in communication with the first circuit, that forms a second representation of the document to extract text lines and identify text pixels;
   a comparator circuit, in communication with the first and second circuits, that compares the second representation with the first representation to identify clusters of first and second colored pixels in each text line to determine the location of embedded binary elements of the message; and
   an extracting circuit, in communication with the comparator circuit that
      sorts the identified first and second colored clusters in each text line in accordance with a predetermined embedding order,
      converts the sorted first and second colored clusters in each text line into a sequence of binary elements, and decodes the sequence of binary elements in each text line to determine an embedded character of the message.

19. The apparatus of claim 18, wherein the first circuit, the second circuit, the comparator circuit, and the extracting circuit are embodied as a single integrated circuit.

20. The apparatus of claim 18, wherein the first circuit, the second circuit, the comparator circuit, and the extracting circuit are physically distinct circuits.

21. A machine-readable medium embodying a program of instructions for causing a machine to perform a method of embedding a message in a text-containing document, the program of instructions comprising instructions for:
   obtaining a pixel representation of the document;
   identifying text pixels of the document;
   determining each text line of the document;
   partitioning each determined text line into a plurality of blocks;
   identifying each block as valid if that block contains at least a predetermined percentage of text pixels and that block is not an immediate neighbor of a block already identified as valid; and
   embedding a binary element in each valid block by labeling text pixels within that block with a first color or a second color to embed the message in the document.

22. The machine-readable medium of claim 21, wherein the step of embedding is carried out text line-by-text line.

23. The machine-readable medium of claim 22, wherein the message comprises at least one character which comprises at least one binary element, and only one character is embedded in each text line.

24. The machine-readable medium of claim 23, wherein a character embedded in a particular text line is repetitively embedded in that text line.

25. The machine-readable medium of claim 23, wherein a character is embedded in more than one text line.

26. The machine-readable medium of claim 22, wherein each valid block of a particular text line has a predetermined embedding order.

27. The machine-readable medium of claim 26, wherein the predetermined order is a column-wise raster order.

28. The machine-readable medium of claim 22, wherein the message comprises at least one character, each of which is comprised of a first binary element sequence, each of the first binary elements being comprised of a second binary element sequence.

29. A machine-readable medium embodying a program of instructions for causing a machine to perform a method of extracting a message embedded in text of document, the program of instructions comprising instructions for:
   obtaining a pixel representation of the document;
   forming a first representation of the document in which pixels are classified to locate blocks of pixels in which data is embedded;
   forming a second representation of the document to extract text lines and identify text pixels;
   comparing the second representation with the first representation to identify clusters of first and second colored pixels in each text line to determine the location of embedded binary elements of the message;
   sorting the identified first and second colored clusters in each text line in accordance with a predetermined embedding order;
   converting the sorted first and second colored clusters in each text line into a sequence of binary elements; and
   decoding the sequence of binary elements in each text line to determine an embedded character of the message.

30. The machine-readable medium of claim 29, wherein the sequence of binary elements in each text line is comprised of a plurality of subsets of binary elements, each of which is representative of a character of the message, and wherein the step of decoding comprises performing majority voting in each text line to determine the character of the message embedded in that text line.

31. The machine-readable medium of claim 29, wherein the step of forming the first representation comprises filtering and sharpening the pixel representation of the document.

32. The machine-readable medium of claim 31, wherein each pixel of the pixel representation of the document comprises multiple color components to define corresponding multiple color planes, and wherein the filtering is applied on each color plane.

33. The machine-readable medium of claim 32, wherein the step of forming the first representation comprises classifying each of the pixels of the document as a first colored pixel, a second colored pixel, or neither.

34. The machine-readable medium of claim 29, wherein the step of forming the second representation comprises thresholding the pixel representation of the document to identify text pixels.

35. An apparatus for embedding a message in a text-containing document, the apparatus comprising:
   means for outputting a pixel representation of the document;
   means, in communication with the outputting means, for identifying text pixels of the document;
   means, in communication with the identifying means, for determining each text line of the document;
   means, in communication with the identifying means and the determining means, for partitioning each determined text line into a plurality of blocks;
   means, in communication with the identifying means and the partitioning means, for classifying each block as valid if that block contains at least a predetermined percentage of text pixels and if that block is not an immediate neighbor of a block already identified as valid; and
   means, in communication with the identifying means and the classifying means, for embedding a binary element in each valid block by labeling text pixels within that valid block with a first color or a second color to embed the message in the document.

36. The apparatus of claim 35, wherein the identifying means, the determining means, the partitioning means, the classifying means, and the embedding means are embodied as a single integrated circuit.

37. The apparatus of claim 35, wherein the identifying means, the determining means, the partitioning means, the classifying means, and the embedding means are physically distinct circuits.

38. An apparatus for extracting a message embedded in text of a document, the apparatus comprising:
   means for outputting a pixel representation of the document;
   means, in communication with the scanner, for forming a first representation of the document in which pixels are classified to locate blocks of pixels in which data is embedded;
   means, in communication with the first representation forming means, for forming a second representation of the document to extract text lines and identify text pixels;

means, in communication with the first and second representation forming means, for comparing the second representation with the first representation to identify clusters of first and second colored pixels in each text line to determine the location of embedded binary elements of the message; and extracting means, in communication with the comparing means, for
   sorting the identified first and second colored clusters in each text line in accordance with a predetermined embedding order,
   converting the sorted first and second colored clusters in each text line into a sequence of binary elements, and
   decoding the sequence of binary elements in each text line to determine an embedded character of the message.

39. The apparatus of claim 38, wherein the first representation forming means, the second representation forming means, the comparing means, and the extracting means are embodied as a single integrated circuit.

40. The apparatus of claim 38, wherein the first representation forming means, the second representation forming means, the comparing means, and the extracting means are embodied as a single integrated circuit.

* * * * *